United States Patent [19]

Virnig

[11] Patent Number: 5,340,380
[45] Date of Patent: Aug. 23, 1994

[54] RECOVERY OF PRECIOUS METAL
[75] Inventor: Michael J. Virnig, Santa Rosa, Calif.
[73] Assignee: Henkel Corporation, Plymouth Meeting, Pa.
[21] Appl. No.: 25,478
[22] Filed: Mar. 3, 1993

Related U.S. Application Data

[63] Continuation-in-part of Ser. No. 853,197, Mar. 18, 1992, Pat. No. 5,198,021.
[51] Int. Cl.$^5$ .............................................. C22B 11/00
[52] U.S. Cl. ......................................... 75/744; 423/24
[58] Field of Search ............................. 75/744; 423/24

[56] References Cited

U.S. PATENT DOCUMENTS

| | | | |
|---|---|---|---|
| 4,814,007 | 3/1989 | Lin et al. | 75/118 |
| 4,895,597 | 1/1990 | Lin et al. | 75/118 |
| 4,992,200 | 2/1991 | Lin et al. | 252/184 |
| 5,028,259 | 7/1991 | Lin et al. | 75/722 |
| 5,073,354 | 12/1991 | Fuller et al. | 423/24 |

FOREIGN PATENT DOCUMENTS

| | | |
|---|---|---|
| 89/2733 | 4/1989 | South Africa . |
| 2186563 | 8/1987 | United Kingdom . |
| 2231047 | 11/1990 | United Kingdom . |

Primary Examiner—Peter D. Rosenberg
Attorney, Agent, or Firm—Ernest G. Szoke; Wayne C. Jaeschke; Patrick J. Span

[57] ABSTRACT

An improved process for recovery of precious metals such as gold or silver using novel ion exchange resins having aryl guanidyl functionality from aryl guanidine compounds having a pKa at 25° C. less than 13 and preferably less than 12. The resins have improved elution properties compared to known guanidine reagents using caustic eluant solutions, particularly improved eluant solutions such as a mixture of sodium hydroxide and sodium benzoate. A selective elution of base metals may be carried out before elution of the precious metals from the resins having guanidyl functionality.

28 Claims, No Drawings

RECOVERY OF PRECIOUS METAL

This application is a continuation-in-part application of U.S. application Ser. No. 07/853,197 filed Mar. 18, 1992, now U.S. Pat. No. 5,198,021.

BACKGROUND OF THE INVENTION

1. Field of the Invention

This invention relates to an improvement in the recovery of precious metals such as gold and silver and in particular to the recovery of gold from aqueous cyanide solutions thereof. The recovery is achieved by contact of the aqueous cyanide solution containing the precious metals, particularly gold, with an ion exchange resin containing a guanidine functionality. The guanidine reagent extracts the gold from the aqueous solution and the gold is then subsequently eluted or stripped from the guanidine reagent and recovered by conventional methods. The invention also relates to certain novel guanidine compounds which are suitable for extracting gold from cyanide solutions.

2. Description of Related Art

Gold occurs primarily as the native metal, alloyed with silver or other metals or as tellurides. It is commonly associated with the sulfides of iron, silver, arsenic, antimony and copper. Silver occurs as finely disseminated metal in rocks of hydrothermal origin as silver chloride, sulfide or tellurides and as complex sulfides with antimony and arsenic. Historical practice with ores containing native metal involves crushing, concentration of the gold or silver by gravity separation and recovery by amalgamation with mercury. Environmental concerns have resulted in abandonment of this process in most cases. Currently there are two major processes for recovery of gold and/or silver. The most widely accepted processes today involve leaching with caustic cyanide solution coupled with recovery of the metal values by concentration with zinc dust (Merrill-Crowe) or concentration of the gold and silver cyanide complexes by absorption on charcoal (carbon absorption scheme) also referred to as Carbon in Column (CIC) or Carbon in Pulp (CIP). A carbon process is also described in U.S. Pat. No. 5,073,354 in which gold and silver also on activated carbon is stripped employing a caustic-benzoate strippent. Another process recently practiced in the Soviet Union is one in which quaternary amine ion exchange resins are employed as a replacement for charcoal in the carbon absorption scheme.

In a recent publication "Selectivity Considerations in the Amine Extraction of Gold from Alkaline Cyanide Solutions" by M. A. Mooiman and J. D. Miller in "Minerals and Metallurgical Processing", August 1984, Pages 153-157, there is described the use of primary, secondary and tertiary amines to which have been added certain Lewis base modifiers such as phosphorus oxides and phosphate esters for the extraction of gold from alkaline cyanide solutions.

Clarified leach liquors containing the gold are obtained by leaching with cyanide solutions through either the dump or heap leaching techniques. In heap leaching, the ore is placed on specially prepared impervious pads and a leaching solution is then applied to the top of the heap and allowed to percolate down through the heap. The solution containing the dissolved metal values eventually collects along the impervious pad and flows along it to a collection basin. From the collection basin, the solution is pumped to the recovery plant. Dump leaching is similar to heap leaching, in which old mine waste dumps which have sufficient metal value to justify processing are leached in place. The gold in clarified leach solutions may be recovered by direct precipitation in the Merrill-Crowe process, or by adsorption on Charcoal in Columns (CIC), followed by either electrowinning or by precipitation in the Merrill-Crowe process.

In certain conditions, unclarified solutions are generated by agitated vat leaching. In this continuous Carbon in Pulp (CIP) leaching process, the ore is slurried with agitated leach solution in the presence of carbon granules to generate a pulp. Dissolved gold is adsorbed onto the carbon resulting in low aqueous gold concentrations, which often increases the rate and completeness of gold extraction from the ore. Carbon granules carrying the gold are separated from the pulp by screening, and the gold is recovered from the carbon typically by elution with hot sodium hydroxide solution followed by electrowinning. Before the carbon granules can be returned to the leaching step, they must be activated by hazardous and expensive washing and heating steps. Coconut shell activated carbon is preferred, but is expensive.

Different amine functionalities have been considered in the past in both the liquid/liquid extraction and liquid/solid extraction of gold. In the case of liquid/solid extraction, aurocyanide is too strongly bound by the quaternary amine functionality of the resins, so that stripping is difficult and requires special treatment. In addition, no selectivity of metal cyanide complexes and leach liquors is shown. Resins with weaker basic amine functionalities cannot perform well in the pH range (10-11), the pH of the common leach liquors. For liquid/liquid extraction such as the work of Mooiman and Miller, organophosphorus modifiers, i.e. trialkylphosphates, are required to increase the amine basicity in order to permit efficient extraction of the gold materials. These materials must be used in large amounts. These systems still do not extract adequately at the typical pH of leach liquors.

In commonly assigned U.S. Pat. Nos. 4,814,007, 4,992,200 and 4,895,597 there is described the use of guanidine compounds for extracting precious metals particularly gold from aqueous alkaline cyanide solutions. Specific guanidine compounds disclosed therein are certain di-alkyl guanidines such as di-n-octyl, di-2-ethylhexyl and di-tridecyl guanidines employed in a liquid/liquid solvent system. In a solid/liquid system, an ion exchange resin carrying guanidyl functionality was employed, specifically a butyl hexyl guanidine carried on a chloromethylated polystyrene resin having a divinylbenzene content, for example, of 2%. In general the guanidine compounds had the formula

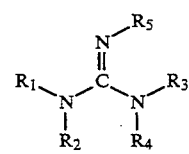

where $R_1$ through $R_5$ are H, an ion exchange resin carrier or a hydrocarbon group having up to 25 carbon atoms. Generally, the guanidine compounds are to have a pKa greater than 12, and preferably should be greater than 13. The patent cautions against having more than one aromatic group, such as phenyl, as such groups tend to decrease the basicity to a level below a pKa of 12. Thus, the groups should be selected to provide guanidine compounds having a pKa preferably above 13. In solutions containing gold, silver and copper, selectivity experiments showed a general preference of gold over silver or copper.

In commonly assigned U.S. Pat. No. 5,028,259, an improvement is described in which an ion exchange resin, carrying certain guanidyl functionality from a methyl substituted guanidine, extracts precious metals and provides for increased selectivity, particularly for gold. In the generalized formula above, when one of the R groups, $R_1$ through $R_5$, is an ion exchange resin carrier, at least one of the remaining R groups is an aliphatic hydrocarbon group having 1–25 carbon atoms and when other than methyl at least 3 of the R groups are hydrocarbon. Specific resins described are N-methyl guanidine resin, N,N-dimethyl guanidine resin and tetramethyl guanidine resin.

In South African Patent 71/4981 the use of guanidines on a resin for extraction of gold from aqueous acidic solutions is described. While general reference is made to alkyl substituted guanidines in which the alkyl group contains 1–6 carbon atoms, the specific resin employed used an unsubstituted guanidine.

In South African Patent 89/2733, a similar process is described using resins containing guanidyl functionality for recovering gold from aqueous alkaline cyanide solutions. In the generalized guanidine formula the R groups are described as H, alkyl or aryl. In the specific examples, the chloromethylated resin carrier is aminated with guanidinium hydrochloride or nitrate providing a guanidine resin, in which no R groups are hydrocarbon.

The references discussed above accordingly teach that where the guanidine is other than guanidine itself, the hydrocarbon substituents should be such as to provide a pKa of preferably greater than 13, and at least greater than 12. Since aromatic groups such as phenyl, may lower the pKa to less than 12, the substituents must be selected to provide the pKa greater than 12, and preferably greater than 13.

DESCRIPTION OF THE INVENTION

In this description, except in the operating examples or where explicitly otherwise indicated, all numbers describing amounts of ingredients or reaction conditions are to be understood as modified by the word "about" in describing the broadest scope of the invention. Practice of the invention within the exact numerical limits is, however, generally preferred.

It has now been discovered that certain guanidine compounds in which an ion exchange resin carrying guanidyl functionality containing aromatic groups, such as phenyl, and which may have a pKa below 12, may be employed to provide an improved process for the extraction of precious metals, such as gold and silver, from aqueous alkaline, cyanide solutions. Guanidine itself has a pKa of about 13.5 and while ion exchange resin carriers, carrying guanidyl functionality of guanidine itself (no hydrocarbon groups) provide for a high gold loading capacity (GLC), such a resin could not be effectively eluted with caustic solution at ambient temperatures (20°–23° C.) or even at elevated temperatures of 60° C. Substantially complete elution could only be obtained by the use of alcoholic (ethanol or methanol) sodium hydroxide eluant, an unacceptable alternative in view of danger of fire in electrowinning cells. Unexpectedly, it was discovered that ion exchange resins carrying guanidyl functionality derived from aryl substituted guanidine compounds, such as phenyl guanidine, which has a low pKa of about 10.8, not only provided high gold loading capacity, but were easily eluted by caustic solution at ambient temperature, and elution is particularly effective at elevated temperatures, such as 60° C. It was further discovered that a non-alcoholic, modified caustic solution provided further improvement in elution, particularly at the ambient temperature. Such a modified, caustic eluant is a mixture of caustic (sodium or potassium hydroxide) and sodium benzoate. The improved process may be generally defined as a process for recovery of a precious metal from an aqueous, alkaline, cyanide solution containing the precious metal wherein (A) the aqueous solution containing the precious metal is contacted with the guanidine functional resin extraction reagent whereby the precious metal is extracted or removed from the aqueous solution and (B) the guanidine functional resin extraction reagent now containing the precious metal is separated from the aqueous solution, now substantially barren of the precious metal, and (C) the adsorbed precious metal is subsequently eluted from the guanidine extraction reagent by a caustic eluant aqueous solution and (D) the precious metal is recovered from the aqueous eluant in a conventional manner, preferably by electrowinning or by precipitation with zinc dust.

The improvement in the process lies in the specific guanidine extraction reagents employed which may be generally defined as having the formula:

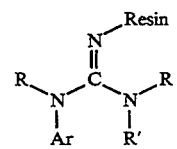

where R is H or an alkyl group having from 1 to about 4 carbon atoms, R' is Ar, H or an alkyl group having from 1 to about 4 carbon atoms and Ar is

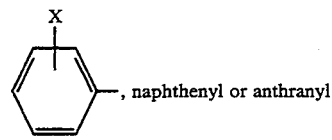, naphthenyl or anthranyl where X is H, R", Cl, F, Br, $NO_2$, —O—R", —O-phenyl, R"—C(O)—O—, R"—C(O)— or R"O—C(O)—, where R" is an alkyl group containing from 1 to about 4 carbon atoms.

Accordingly, an ion exchange resin carrying guanidyl functionality of aryl guanidine compounds having a pKa value less than 13, and preferably less than 12, when employed to extract the precious metal values from aqueous, alkaline cyanide solutions and the resin subsequently eluted with aqueous caustic solutions, particularly the specific improved eluant solution described in more detail hereafter, provides an improved process resulting not only in high precious metal loading capacity, but also high elution efficiencies, to provide a highly efficient precious metal recovery process. The process retains high selectivity for gold over silver, copper and zinc, which may be present in alkaline, cyanide, aqueous gold leach liquors.

Accordingly, the present invention is applicable to a liquid/solid extraction process for the recovery of precious metals, such as gold or silver from aqueous alkaline, cyanide solutions containing the precious metal values comprising (1) contacting the aqueous solution with an ion exchange resin carrying guanidyl functionality from an aryl guanidine compound having a pKa below 13, and preferably below 12, to extract at least a portion of the precious metal from the aqueous solution;

(2) separating the resultant substantially precious metal-barren solution from the guanidyl functional ion exchange resin now containing the precious metal values adsorbed on the resin as a cyanide complex;

(3) eluting the adsorbed precious metal complex from the resin with a caustic eluant stripping aqueous solution; and (4) recovering the precious metal from the aqueous eluant.

The present invention is also directed to certain novel ion exchange resins carrying an aryl guanidine functionality, i.e., containing the functional group:

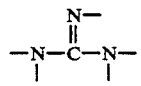

wherein at least one of the N atoms contains an aryl substituent as defined earlier. In regard to the ion exchange resin the group is bonded by chemical reaction to the resin through any one of the N atoms. The bonds of the nitrogen atoms otherwise are filled by hydrogen or the aryl or alkyl groups as earlier defined.

The guanidine compounds suitable for the novel ion exchange resins of the present invention are those whose aqueous solutions at 25° C. have a pKa value below 13, and preferably below 12. Unexpectedly, it was found that it was not necessary that the guanidine compounds have pKa values preferably above 13 and that, while gold values were more easily eluted from the resins carrying aryl guanidine functionality from guanidine compounds having pKa values below 13, and preferably below 12, effective extraction was still possible. Thus, the compounds of this invention combine good extraction with good elution. The aryl guanidine for the novel ion exchange resins of the present invention, will accordingly have pKa values of guanidine solutions in water at 25° C. below 13, preferably below 12, more preferably in the range of about 9.5 to about 11.5, more desirably above 10 and most preferably about 10.5.

As the ion exchange resin containing the guanidine functionality will be used to treat or contact a gold-containing aqueous solution, the ion exchange resin must be one which is water-insoluble. Upon contact of the aqueous cyanide solution containing the precious metals, the precious metals are selectively absorbed by the guanidine reagent on the ion exchange resin. The metal values are then eluted from the ion exchange resin by contact with a caustic, sodium hydroxide solution. The techniques employed in the production of water-insoluble ion exchange resins employed in the process of the present invention are well-known to those skilled in the art, and especially, to those skilled in the art of polymerizing monomers to produce polymeric compositions useful as ion exchange resins. In the present invention, the preferred ion exchange resin is a chloromethylated polystyrene divinylbenzene resin which, upon chemical reaction with the appropriate compound, provides a guanidine functionalized ion exchange resin. Such resins containing varying divinylbenzene (DVB) contents are well known to those skilled in the art. Resins containing up to 25% DVB content may be employed. However, the preferred polystyrene resins will generally not exceed 13–15% DVB content. It is also desirable that the DVB content be at least 2–4% with about 6–10 being most preferred.

While the polystyrene resins are preferred, ion exchange resins having a different base, matrix or backbone may be used. Any suitable matrix or backbone which can carry the guanidine functionality as an active group may be employed. Other resin bases of matrices which are suitable are the urea formaldehyde, melamine formaldehyde resins, polyacrylic resins or glycidyl methacrylate resins, such as poly (glycidylmethacrylate-co-ethylene glycol dimethacrylate) resins.

The particle size of the ion exchange resin can vary widely, so long as the size range is generally fine enough to exhibit desirable loading and elution kinetics and yet large enough to (a) allow the solution to flow through the bed without binding or building up excess pressure; and (b) allow convenient screening of the resin from the aqueous solution. Preferably, about a 6 to about 12 mesh size is employed. The loading of the water-insoluble ion exchange resins with the guanidine can vary widely. Generally, it will be determined by the bed-volume characteristics of the particular water-insoluble ion exchange resin. Typically, the flow rates through the ion exchange bed will be such as to assure effective absorption onto the water-insoluble ion exchange resins.

In order to ensure an acceptable diffusion rate through the resin structure, a water retention capacity (WRC) between about 50 to about 60% is desirable. The gold loading capacity (GLC) of the guanidine resins of the present invention are determined using a synthetic leach solution having a pH of 10.5 and free cyanide of about 160 mg/l and containing the following metals as the cyanide complexes: Au—5 mg/l; Ag—0.5 mg/l; Zn—2 mg/l; Co—1 mg/l; Ni—5 mg/l; Fe—10 mg/l; and Cu—10 mg/l; and desirably is above 15,000 mg/Kg, and preferably above about 20,000 or about 25,000 mg/Kg. Gold elution efficiencies (using 0.5M NaOH at 60° C. as the eluant), are desirably above 90% and preferably above 95%, most preferably 98 or 99%.

As the invention is particularly directed to gold recovery, it is desirable for the aryl guanidine resin of the present invention to have a high selectivity for gold over other metal cyanides, i.e. a high ratio of gold concentration (mg/Kg) to total metal concentration (mg/Kg) on a loaded absorbent, or a selectivity ([Au]/[M]) of greater than 0.50. The aryl guanidine resins of the present invention may provide selectivities on the synthetic leach solutions noted above, up to in excess of about 0.8 (0.82 for the 1-methyl-1-phenylguanidine resin and 0.62 for the phenyl guanidine resin).

Accordingly, the present invention provides aryl guanidine resins having a combination of desirable properties for effective recovery of gold values, namely:
(a) high gold loading capacity
(b) high selectivity for gold
(c) high elution efficiencies After the water-insoluble ion exchange resin containing the guanidine reagent has been loaded with the precious metal values, the aqueous cyanide solution is separated from the ion exchange resin and the absorbed precious metal values are eluted or stripped from the ion exchange resin. A most efficient and effective unmodified eluant is an aqueous solution of sodium hydroxide having a pH above 11, more desirably above 12, and preferably at least 13. Thus, a caustic sodium hydroxide solution which may also contain cyanide ions, may be employed. Other basic or alkaline eluant solutions, such as potassium, lithium or calcium hydroxide solutions may be employed.

The present invention is also directed to a modified caustic eluant solution, which not only provides for improved elution over the use of caustic sodium hydroxide alone with the aryl guanidine resin of the present invention, but also provides for improved elution when employing guanidine resins of the prior art such as resins of simple guanidine itself, or the substituted guanidine resin described in U.S. Pat. Nos. 4,814,007, 4,992,200, 4,895,597 and 5,028,259, discussed earlier above. Accordingly, the present invention includes an improvement in the process of recovering precious metal values from aqueous alkaline cyanide solutions in which the solutions are contacted with any guanidine resin to extract the precious metal and after separation of the now barren aqueous solution from the guanidine resin, the adsorbed precious metal is eluted from the resin, the improvement comprising elution using the modified eluant described hereinafter.

Attempts to modify the caustic sodium hydroxide eluant to improve elution, in the past included the addition of an alcohol such as methanol or ethanol. While such addition of alcohol provided some improvement in elution, such alcohols provide a fire hazard in the electrowinning cells employed in the subsequent recovery of the gold. To avoid such hazards however, polyhydric alcohols such as ethylene glycol, propylene glycol, sorbitol, glycerol, trimethylol propanol and the polyalkylene glycols may be employed. The alcohols may be employed in an amount up to about 40% by weight of the caustic eluant solution, preferably about 10 to about 35%. The preferred modified eluant of this invention comprises a mixture of sodium benzoate and sodium hydroxide, preferably a mixture of 0.5M sodium benzoate and sodium hydroxide. The addition of 30% ethylene glycol to a solution of 0.5M NaOH and 0.5M Sodium benzoate has been shown to improve the elution properties. The corresponding potassium compound may be employed. Also, water soluble salts of other preferred acids including the substituted benzoic acid compounds such as salicylic acid, and water soluble salts of aliphatic acids containing about 4 to about 14, and more preferably 4 to about 10 carbon atoms, such as octanoic acid, may be employed to provide the carboxylate functionality. Water soluble salts of sulfonic and phosphorus organic acids may also be employed. Salts of polycarboxylic acids, such as polyacrylic acid or terephthalic acid, may be employed alone or along with the acids above. The components of the eluant solution will be employed, in terms of molar concentration of the individual components will lie in a range of about 0.1M to about 2M, preferably about 0.1 to about 1M and most preferably about 0.5 to about 1M for the caustic. For the acid component, a molar concentration up to about 2M, desirably from about 0.05 to about 1M, and most preferably about 0.5 to about 1M is employed.

The elution efficiency of the mixture of 0.5M NaOH and 0.5M sodium benzoate is particularly effective at 60° C. significantly higher than the use of 0.5M NaOH at 60° C. or mixture of 0.5M NaOH and 0.5 molar sodium acetate, which provides about the same efficiency as 0.5M NaOH itself. At ambient temperatures, about 20°-25° C., the mixture of 0.5M NaOH and 0.5M sodium benzoate, provides an elution efficiency lower than the efficiency at 60° C., but efficiencies above those of 0.5M NaOH at ambient temperatures and above 90% may be provided in elution of a phenyl guanidine resin.

It was discovered that alkyl substituted benzoic acid salts are even more effective than sodium benzoate itself. Thus caustic solutions of NaOH and sodium isopropyl benzoate will elute a greater percentage of gold than a sodium benzoate—NaOH solution.

It was further discovered that caustic solutions of NAOH and branched chain acids are particularly effective eluants, on the order of isopropyl benzoate, a branched alkyl substituted benzoate. Thus, sodium salts such as the valerate, 2-ethylhexanoate, and isotridecanoate are particularly effective eluants for gold.

It was also discovered that organic sulfonic acid salts such as sodium methane sulfonic acid and the benzene or p-toluene sulfonic acid sodium salt. The p-toluene sulfonic acid salt is preferred over the methane sulfonic acid salt as it elutes gold on the order of sodium salt of the long chained branched acids noted above.

To further illustrate the various objects and advantages of the present invention, the following examples are provided in which all parts and percentages are by weight unless otherwise indicated. It is understood that their purpose is entirely illustrative and in no way intended to limit the scope of the invention.

In the examples, the preparation of the guanidine-type resins followed the typical procedure below:

A. Polymerization

A polystyrenic matrix with a cross-linkage of 6% divinylbenzene (DVB) was prepared by the addition polymerization technique. The aqueous phase consisting of water (668 ml), hydroxymethyl cellulose (1.68 g), lignosulfate (1.68 g) and calcium chloride (8.4 g) was stirred while being heated at 87° C. An organic phase (or monomer mixture) which included styrene (240 g), divinylbenzene (25 g; 63.5%), octanoic acid (272 ml) and benzoyl peroxide (BPO; 4.76 g) was mixed until the catalyst (BPO) was dissolved. As soon as the aqueous phase reached 80° C., the organic phase was added to the aqueous mixture while stirring slowly. The stirring rate was then adjusted to obtain the required droplet size. After monomer addition, the reaction temperature went up to approximately 86° C. due to an exothermic reaction. The reaction temperature decreased and was controlled at 80° C. for 17 hours.

The resin beads (raw polymer) were collected by filtration and stirred in one liter of 2.5M sodium hydroxide solution (1.5 moles per mol of octanoic acid used during polymerization) at 60° C. for one hour to dissolve the octanoic acid. The resin beads were washed to neutrality and screened between +600 μm and −1000 μm.

B. Chloromethylation

Chloromethylmethylether containing reagent (CMME) was prepared by adding dimethoxymethane (600 ml) dropwise to thionylchloride (500 ml) at a temperature of −7° to 0° C. The mixture was allowed to reach ambient temperature and was then stored in a dry bottle. CMME (17 ml per gram of resin) was added to oven-dried polystyrene beads. Stannic chloride (0.375 ml per gram of resin) was added dropwise to the mixture over 15 minutes. The reaction was carried out at 40° C. for five hours. The reaction mixture was then cooled and the excess of CMME was destroyed by the dropwise addition of methanol until no further reaction took place and then water was added slowly. The beads were filtered off and washed in a column with water until the effluent was neutral.

C. Amination

Chloromethylated polystyrene beads (15 g; 98.3 mmol), sodium hydroxide pellets (3.93 g; 98.3 mmol), guanidine (98.3 mmol) and 80 ml of solvent (ethanol or water) were heated at a temperature of 80° C. The aminated resins were thoroughly washed with ethanol and several times with water before being stored in water. The resins were analyzed for their carbon, hydrogen, chlorine and nitrogen contents by the means of a Heraeus Rapid CHN—O-analyzer.

Unless indicated otherwise, the water retention capacity (WRC) is determined as follows:

A known volume of resin was placed in a sintered glass funnel which was covered with a damp cloth. Mild suction was applied across the funnel for three minutes whereafter the mass of the resin ("wet resin") was determined. The resin was dried at 60° C. overnight and weighed ("dry resin"). Water retention capacity (WRC) of the resin is then calculated as follows:

$$WRC, \% = \frac{\text{mass (wet resin)} - \text{mass (dry resin)}}{\text{mass (wet resin)}} \times 100$$

In determining the gold loading capacity (GLC) and other metal loading, a column loading test employing the following procedure is conducted:

A synthetic leach solution which contained the following metals as the cyanide complexes: gold (5 mg/l); silver (0.5 mg/l); zinc (2 mg/l); cobalt (1 mg/l); nickel (5 mg/l); iron (10 mg/l) and copper (10 mg/l), was used. The concentration of the free cyanide in the solution was approximately 160 mg/l and the pH of the solution was 10.5. The solution was pumped through a bed of resin (1 ml) at a flowrate of 2.5 bed volumes per hour for 72 hours. The loaded resins were rinsed with water, dried at 60° C. and analyzed for the various metals. Gold loading capacity is defined as the concentration of gold on the loaded resin in milligrams per kilogram.

Elution results, such as elution efficiency (EE), were obtained using the procedure as follows:

Resin (5 ml) was contacted in a batch rolling test for 24 hours with a concentrated metal cyanide solution (1 l) which contained the following metals: gold (100 mg/l); silver (10 mg/l); zinc (40 mg/l); cobalt (20 mg/l); nickel (100 mg/l); iron (200 mg/l) and copper (200 mg/l). The resin was removed from this solution by filtration and the solution was analyzed for gold. A portion of the loaded resin (1 ml) was dried and analyzed for the various metals. The remaining resin (4 ml) was packed in a jacketed column. Eluant was pumped through the resin bed at a flowrate of approximately one bed volume per hour for approximately three days and the temperature in the column was controlled at 60° C. The eluate was collected in fractions by a fraction collector and the various fractions were analyzed for gold. The eluted resin was washed with water until the effluent was neutral, dried and analyzed for the residual metals. Elution efficiency is defined as $100 \times (C_L - C_E)/C_L$, where $C_L$ is the concentration of metal on the loaded resin, and $C_E$ is the concentration of metal on the eluted resin.

EXAMPLE 1

In this example, guanidine resins were prepared following the typical procedure described above, from phenyl guanidine (which has a pKa of 10.8) and 1-methyl-1-phenyl guanidine (which has a pKa of 12.7). For comparison, a simple unsubstituted guanidine resin (which has a pKa of 13.5) was also prepared along with other guanidine resins. The various resins codes and the amines employed in their preparation are as follows:

| Resin Code | Amine |
|---|---|
| G | Guanidine |
| DMG | 1,3-dimethylguanidine |
| TMG | 1,1,3,3-tetramethyl-guanidine |
| DEG | 1,3-diethylguanidine |
| PHG | Phenylguanidine |
| MPHG | 1-methyl-1-phenylguanidine |

The resin types were prepared from a macroporous polystyrene matrix with a cross-linkage of 6% DVB. The matrix (raw beads) was fully chloromethylated and had a chlorine content of about 19.5%, which was then aminated as described earlier with the amines indicated above. The microanalytical results for the aminated resins are given in Table 1 below.

TABLE 1

| Resin Code | C, % | H, % | N, % | Cl, % |
|---|---|---|---|---|
| G | 72.1 | 7.1 | 7.0 | 6.82 |
| DMG | 73.0 | 7.7 | 7.2 | 3.7 |
| TMG | 76.2 | 7.9 | 4.9 | 2.7 |
| DEG | 74.5 | 7.7 | 7.1 | 4.5 |
| PHG | 77.8 | 6.4 | 4.56 | 12.6 |
| MPHG | 79.6 | 6.9 | 1.93 | 11.7 |

EXAMPLE 2

In this example, the water retention capacity (WRC) and gold loading capacities (GLC) were determined as earlier described and the WRC, GLC and selectivity [Au]/[M] results are given in Table 2, for the resins indicated and for a commercially available weak base amine resin, Duolite A365.

TABLE 2

| Resin | Group content,* mmol/g | WRC % | GLC mg/kg | [Au]** [M] |
|---|---|---|---|---|
| G | 1.66 | 52.6 | 35 400 | 0.65 |
| DMG | 1.72 | 53.0 | 36 800 | 0.63 |
| TMG | 1.17 | 54.8 | 18 800 | 0.83 |
| DEG | 1.68 | 56.9 | 35 200 | 0.65 |

TABLE 2-continued eluate was collected in fractions which were analyzed for their gold concentrations.

TABLE 3

| Resin<br>Analysis of loaded resin<br>Analysis of eluted resin | Metal concentration on resin, mg/kg | | | | | | |
|---|---|---|---|---|---|---|---|
| Elution efficiency, % | Au | Ag | Zn | Ni | Co | Fe | Cu |
| G: | | | | | | | |
| Loaded | 54 200 | 374 | 1500 | 5170 | 670 | 1900 | 4290 |
| Eluted | 5 080 | <200 | <200 | <200 | 290 | <200 | <200 |
| EE, % | 90.6 | >46.5 | >86.7 | >96.1 | 56.7 | >89.4 | >95.3 |
| DMG: | | | | | | | |
| Loaded | 58 100 | 391 | 1710 | 5750 | 763 | 1090 | 5580 |
| Eluted | 14 100 | <210 | <210 | <210 | 266 | <210 | <210 |
| EE, % | 75.7 | >46.3 | >87.7 | >96.3 | 65.1 | >80.7 | >96.2 |
| TMG: | | | | | | | |
| Loaded | 18 400 | <100 | 166 | 126 | <100 | <100 | <100 |
| Eluted | 7 690 | <200 | <200 | <200 | <200 | <200 | <200 |
| EE, % | 58.2 | nc$^b$ | nc | nc | nc | nc | nc |
| DEG: | | | | | | | |
| Loaded | 55 000 | 361 | 1670 | 5350 | 537 | 412 | 4180 |
| Eluted | 13 500 | <200 | <200 | <200 | 215 | <200 | <200 |
| EE, % | 75.5 | >44.6 | >88.0 | >96.3 | 60.0 | >51.4 | >95.2 |
| PHG: | | | | | | | |
| Loaded | 50 300 | 235 | 1270 | 4430 | 394 | 1550 | 2450 |
| Eluted | 482 | <200 | <200 | <200 | <200 | <200 | <200 |
| EE, % | 99.0 | nc | >84.3 | >95.6 | nc | >87.1 | >91.8 |
| MPHG: | | | | | | | |
| Loaded | 41 700 | <190 | 380 | 1070 | <190 | <190 | 320 |
| Eluted | 3 510 | <210 | <210 | <210 | <210 | <210 | <210 |
| EE, % | 91.6 | nc | nc | >80.4 | nc | nc | nc |
| DUOLITE A365: | | | | | | | |
| Loaded | 46 200 | 126 | 1730 | 3540 | 590 | 10 900 | 2060 |
| Eluted | 365 | <190 | <190 | <190 | <190 | <190 | >190 |
| EE, % | 99.2 | nc | >89.0 | >99.6 | >67.8 | >98.3 | >90.8 |

| Resin | Group content,*<br>mmol/g | WRC<br>% | GLC<br>mg/kg | [Au]**<br>[M] |
|---|---|---|---|---|
| HEMG | 1.25 | 50.1 | 28 700 | 0.72 |
| PHG | 1.09 | 54.2 | 25 700 | 0.62 |
| MPHG | 0.46 | 52.1 | 21 800 | 0.82 |
| Duolite A365 | — | 55.0 | 12 000 | 0.49 |

*functional group content of resin as calculated from the nitrogen content
**ratio of gold concentration (mg/kg) to total metal concentration (mg/kg) on resin Because of the difficulty in measuring ion exchange capacities of the guanidine resins accurately by conventional methods due to the high pKa values of the groups, the nitrogen contents of the resins were used to calculate functional group contents. As can be seen, the DMG and DEG had capacities similar to the simple guanidine resin G. The PHG and MPHG, while having lower loading capacities than the simple guanidine resins, were higher than the TMG resin, and relatively high compared to the commercial weak base resin, Duolite A365. The selectivity for gold for all the guanidine resins were significantly higher than the commercial weak base resin, the PHG and MPHG resins having a selectivity of 0.62 and 0.82 respectively.

The data above was gathered on a leach solution of a pH of 10.5, which is the pH of typical alkaline cyanide leach solutions.

EXAMPLE 3

In this Example the resins were preloaded in a concentrated metal cyanide solution prior to elution tests. The concentrations of the various metals on the loaded and eluted resins and the elution efficiencies obtained for the different metals with each resin are given in Table 3. Sodium hydroxide eluant (0.5M) at 60° C. was used. The eluant was pumped through a packed bed of resin at a flowrate of one bed volume per hour. The In the foregoing, only gold elution was monitored and the elution efficiencies of the other metal cyanides were calculated from the analysis of the loaded and eluted resins. The elution of gold was monitored with 0.5M sodium hydroxide at 60° C. from various resins G, PHG and MPHG at a number of bed volumes up to 80. The effect of electronwithdrawing substituents on guanidine, thus functional groups with lower pKa values, can be seen by much higher elution efficiencies obtained with resins PHG and MPHG than with G especially after the first day of elution. Within one day the elution efficiencies for the three resins were as follows: resin PHG 96%, resin MPHG 86% and G 70% which is the order of increasing pKa value of the functionality. PHG has a pKa value of 10.8, MHPG has a pKa of 12.7, and unsubstituted guanidine has a pKa above 13, of 13.50. After 3 days the elution efficiencies were as follows: PHG 99%, MPHG 92% and G 91%. It is thus clear that the lowering of the pKa value of the functional groups did have the desired effect on the elution. Resin PHG had a reasonable loading capacity and it was effectively stripped with 0.5M sodium hydroxide solution at 60° C. This resin is thus the most preferred.

EXAMPLE 4

In this example is illustrated the effectiveness of a caustic sodium benzoate eluant. With 47 bed volumes of eluant, within 2 days 97.5% of the gold was eluted with the 0.5M NaOH—0.5M sodium benzoate. The results can be seen from Table 4 below which also includes elution data on the G resin from Table 3 using 0.5M NaOH alone for comparison. The NaOH-sodium benzoate eluant thus was a most effective gold eluant. To consider the possibility that the benzoate anions which replaced the gold cyanide on the resin would be so strongly held that the resin loading capacity would be reduced in the second loading cycle, the NaOH-Na benzoate eluted resin was thus subjected to the column loading test. The GLC was 38 300 mg/kg and the ratio of gold to metal concentration ([Au]/[M]) was 0.63. These results are very similar to those found for the guanidine resin G in the first loading cycle (Table 2).

TABLE 4

| Eluant<br>Analysis of loaded resin<br>Analysis of eluted resin | Metal concentration on resin, mg/kg | | | | | | |
|---|---|---|---|---|---|---|---|
| Elution efficiency, % | Au | Ag | Zn | Ni | Co | Fe | Cu |
| 0.5M NaOH | | | | | | | |
| Loaded resin | 54 200 | 374 | 1500 | 5170 | 670 | 1900 | 4290 |
| Eluted resin | 5 080 | <200 | <200 | <200 | 290 | <200 | <200 |
| EE, % | 90.6 | >46.5 | >86.7 | <96.1 | 56.7 | >89.4 | >95.3 |
| 0.5M NaOH + 0,5M<br>Na-benzoate* | | | | | | | |
| Loaded resin | 49 200 | 335 | 1340 | 4310 | 389 | 1530 | 3700 |
| Eluted resin | 1 220 | <140 | <140 | <140 | <140 | 211 | <140 |
| EE, % | 97.5 | >58.2 | >89.6 | >96.8 | >64.0 | 86.2 | >96.2 |

*Note that these results were obtained after two days, whereas all the other results were after three days.

From the foregoing examples it can be seen that resins carrying guanidine derivatives with aryl electron withdrawing substituents, such as phenylguanidine and 1-methyl-1-phenylguanidine, having pKa value below 13, i.e. 10.8 and 12.7 respectively, provide for an improved process in that such resins have the high gold loading capacities and selectivity of guanidine resins and can be almost completely eluted (99%) within three days as compared with 90% gold elution from a resin carrying guanidine itself, over the same period. In addition, approximately 96% of the gold was stripped from the phenylguanidine resin within one day. From a guanidine itself resin, only about 70% of the gold is eluted within one day.

EXAMPLE 5

A series of modified eluant solutions were evaluated to illustrate the gold elution from a guanidine resin (G) employing an eluant solution of 0.5M NaOH and 0.5M NaROO⁻ salt. The results can be seen from the following Table 5.

TABLE 5

| Au Elution from G Guanidine Resin<br>by 0.5M NaOH/0.5M NaROO | | | |
|---|---|---|---|
| Salt | Au on Loaded<br>Resin, mg<br>Au/g | Au eluted,<br>mgAu/g | % Au Eluted |
| None | 44.4 | 4.87 | 11.0 |
| Benzoate | 44.4 | 12.9 | 29.0 |
| Valorate | 44.4 | 11.9 | 26.9 |
| 2-Ethylhexanoate | 44.4 | 18.0 | 40.5 |
| Iso-Tridecanoate | 44.4 | 20.0 | 45.0 |
| Iso-Propylbenzoate | 44.4 | 19.5 | 44.0 |
| Terephthalte | 44.4 | 4.35 | 9.80 |
| MSA | 44.4 | 5.60 | 12.6 |
| pTSA | 44.4 | 17.6 | 39.9 |
| 0.5M NaOH/0.5 Na<br>Benzoate/30%<br>Ethylene glycol | 44.4 | 15.2 | 34.2 |

It has also been discovered that it is possible to selectively elute the base metal cyanide complexes from the guanidine resin without eluting any appreciable amount of gold by using a solution of sodium cyanide or sodium chloride. This enables one to selectively remove the base metals prior to elution of the gold using one of the eluents described earlier. In this way one can obtain a relatively pure concentrated gold solution from which the gold can be more efficiently recovered by electrowinning.

EXAMPLE 6

In this example, selective stripping experiments with the guanidine resin (G) after loading the resin beads with metal cyanide salts in levels of mg metal/g. of resin of: Au (44.4), Ag (0.73), Zn (7.21), Ni (9.03), Fe (2.50) and Cu (1.20). The metal solids which is used to calculate the metal available to eluent. The following Table 6 illustrates the results of the selective stripping experiments with various eluents, including the 0.5M NaOH/0.5 M sodium benzoate solution and various levels of NaCN and NaCl.

TABLE 6

| Eluant | [Metal] on<br>Loaded Resin mg/g | | | | Metal eluted, mg/g resin | | | |
|---|---|---|---|---|---|---|---|---|
| | Au | Zn | Ni | Cu | Au | Zn | Ni | Cu |
| 0.5M NaOH | 44.4 | 5.50 | 8.42 | 2.34 | 4.87 | — | — | — |
| 0.5M NaOH/0.5M NaBenzoate | 44.4 | 5.50 | 8.42 | 2.34 | 15.2 | 5.14 | 9.54 | 2.3 |
| 0.1M NaCN | 44.4 | 5.50 | 8.42 | 2.34 | 0.58 | 2.75 | 1.62 | 0.50 |
| 0.25M NaCN | 4.44 | 7.21 | 9.03 | 3.33 | 0.84 | 1.56 | 8.69 | 0.72 |
| 1M NaCN | 4.44 | 7.21 | 9.03 | 3.33 | 1 | 2.57 | 4.06 | 3.18 |
| 2M NaCN | 44.4 | 7.21 | 9.03 | 3.33 | 1.11 | 3.86 | 7.42 | 3.88 |
| 1M NaCl | 44.1 | 7.21 | 9.03 | 3.33 | 0.49 | 0.49 | 2.65 | 0.78 |
| 2M NaCl | 44.4 | 7.21 | 9.03 | 3.33 | 0.64 | .90 | 4.42 | 1.19 |

*Note: Occasional Cu and Ni elution values exceed the starting metal loading on resin. This may indicate artificial concentrations due to liquid volume loss from eluant or show variability in calculation of metal loading initially.

As can be seen from Table 6, an aqueous solution of an alkali metal cyanide or an alkali metal chloride may be employed to selectively elute the base metals. Solutions of about 0.1M to about 2M of the alkali metal cyanide may be employed. Similarly aqueous solutions of about 1M to about 3M of the alkali metal chloride may be employed. Sodium cyanide and sodium chloride solutions are the preferred base metal eluantes.

I claim:

1. A process for the recovery of a precious metal from aqueous alkaline cyanide solutions containing said metal comprising:
   (A) contacting said aqueous solution containing said precious metal with an ion exchange resin carrying guanidine functionality of a guanidine compound wherein said precious metal value is extracted from said aqueous solution;

(B) separating said aqueous solution from said ion exchange resin carrying said guanidyl functionality; and (C) eluting said precious metal from said ion exchange resin with an aqueous, alkaline, eluant solution having a pH above about 12, and containing an eluant modifier selected from the group consisting of
  (a) an alkali metal salt of a branched chain aliphatic or a branched chain aliphatic substituted aromatic carboxylic acid having from about 3 to about 14 carbon atoms in the branched chain, and
  (b) an alkali metal salt of an aliphatic or aromatic sulfonic acid; and (D) recovering said precious metal from said eluant solution.

2. A process as defined in claim 1, wherein said precious metal is gold or silver.

3. A process as defined in claim 1, wherein said ion exchange resin carrying said guanidyl functionality is a polystyrene divinylbenzene resin.

4. A process as defined in claim 3, wherein said ion exchange resin has a divinylbenzene content up to about 25% by weight.

5. A process as defined in claim 4, wherein said divinylbenzene content is at least 3% up to about 15%.

6. A process as defined in claim 4, wherein said divinylbenzene content is about 6 to about 10%.

7. A process as defined in claim 1, wherein said caustic eluant solution further contain up to about 40% by weight of a polyhydric alcohol.

8. A process as defined in claim 7, wherein said polyhydric alcohol is present in an amount of about 10 to about 35%.

9. A process as defined in claim 8, wherein said polyhydric alcohol is ethylene glycol present in an amount of about 30%.

10. A process as defined in claim 1, wherein the eluant modifier (a) is an alkali metal salt of an acid selected from the group consisting of valeric acid, 2-ethyl hexanoic acid, isotridecanoic acid and isopropyl benzoic acid.

11. A process as defined in claim 10, wherein said eluant modifier is selected from the group consisting of sodium valerate, sodium 2-ethylhexanoate, sodium isotridecanoate, and isopropyl benzoate.

12. A process as defined in claim 10, wherein said eluant solution is a 0.1 to about 2M solution of sodium hydroxide containing said eluant modifier (a) in about a 0.1M to about a 2M concentration.

13. A process as defined in claim 1, wherein the eluant modifier (b) is an alkali metal salt of an acid selected from the group consisting of methane sulfonic acid and benzene or p-toluene sulfonic acid.

14. A process as defined in claim 13, wherein said eluant solution is about a 0.1M to about 2M solution of sodium hydroxide containing said eluant modifier (b) in about a 0.1M to about a 2M concentration.

15. A process for the recovery of a precious metal from aqueous alkaline cyanide solutions containing said metal comprising:
(A) contacting said aqueous solution containing said precious metal with an ion exchange resin carrying guanidine functionality of a guanidine compound wherein said precious metal value is extracted from said aqueous solution;

(B) separating said aqueous solution from said ion exchange resin carrying said guanidyl functionality;

(C) eluting said precious metal from said ion exchange resin with an aqueous, alkaline, eluant solution having a pH above about 12; and comprised of about a 0.1M to about 2M solution of sodium hydroxide and about a 0.05M to about a 2M solution of sodium benzoate and up to about 40% by weight of a polyhydric alcohol; and (D) recovering said precious metal from said eluant solution.

16. A process as defined in claim 15, wherein said polyhydric alcohol is ethylene glycol present in an amount of about 30% by weight.

17. A process for the recovery of a precious metal from aqueous alkaline cyanide solutions containing said metal and a base metal comprising:
(A) contacting said aqueous solution containing said precious metal and base metal with an ion exchange resin carrying guanidyl functionality of a guanidine compound wherein said precious metal and said base metal values are extracted from said aqueous solution;

(B) separating said aqueous solution from said ion exchange resin carrying said guanidyl functionality;

(C) selectively eluting said base metal values from said ion exchange resin with an aqueous alkaline, metal cyanide or alkali metal chloride eluant solution;

(D) separating the aqueous cyanide or chloride eluant solution containing base metal values from the ion exchange resin now retaining the precious metal values;

(E) eluting the precious metal values from the ion exchange resin with an aqueous alkaline, eluant solution having a pH above 12, comprised of a solution of NaOH, KOH, LiOH or Ca(OH)$_2$, which may also contain cyanide ions; and (F) recovering said precious metal from said aqueous alkaline eluant solution.

18. A process as defined in claim 17 wherein the precious metal is gold and is recovered from the eluant solution by electrowinning or precipitation with zinc dust.

19. A process as defined in claim 17, wherein the base metal eluant solution is about a 0.1M to about a 2M solution of sodium cyanide.

20. A process as defined in claim 17, wherein the base metal eluant solution is about 1M to about 3M solution of sodium chloride.

21. A process as defined in claim 17, wherein said precious metal eluant solution is a 0.1M to about 2M solution of sodium hydroxide.

22. A process as defined in claim 17, wherein said precious metal eluant solution is about a 0.5M solution of sodium hydroxide.

23. A process as defined in claim 22, wherein said eluant solution further comprises as water soluble alkali metal salt of an aromatic acid or an aliphatic acid having from about 4 to about 14 carbon atoms, employed in about 0.05M to about a 2M concentration.

24. A process as defined in claim 23 wherein the alkali metal salt of the aromatic or aliphatic acid is selected from the group consisting of sodium benzoate, sodium salicylate, sodium isopropylbenzoate, sodium valerate, sodium isotridecanoate and sodium 2-ethylhexanoate.

25. A process for the recovery of a precious metal from aqueous alkaline cyanide solutions containing said metal comprising;
  (A) contacting said aqueous solution containing said precious metal with an ion exchange resin carrying guanidine functionality of a guanidine compound wherein said precious metal value is extracted from said aqueous solution;
  (B) separating said aqueous solution from said ion exchange resin carrying said guanidyl functionality;
  (C) eluting said precious metal from said ion exchange resin with an aqueous alkaline, eluant solution having a pH above 12, and an alkali metal salt of an aromatic or aliphatic organic acid containing from about 4 to about 14 carbon atoms and an alkaline compound selected from the group consisting of NaOH and KOH and about 5 to about 40% by weight of a polyhydric alcohol; and
  (D) recovering said precious metal from said eluant solution.

26. A process as defined in claim 25, wherein said polyhydric alcohol is present in an amount of about 10 to about 35% by weight.

27. A process as defined in claims 26 wherein said polyhydric alcohol is ethylene glycol present in an amount of about 30% by weight.

28. A process as defined in claim 25 wherein said precious metal is gold and is recovered from the eluant solution by electrowinning or precipitation with zinc dust.

* * * * *